UNITED STATES PATENT OFFICE.

ALFRED HERRE AND BERNHARD JAECKEL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

BROWN SULFUR DYE.

No. 895,637.     Specification of Letters Patent.     Patented Aug. 11, 1908.

Application filed April 8, 1908. Serial No. 425,847.

*To all whom it may concern:*

Be it known that we, ALFRED HERRE and BERNHARD JAECKEL, doctors of philosophy, chemists, citizens of the German Empire, residing at Elberfeld, Germany, Kingdom of Prussia, have invented new and useful Improvements in New Brown Sulfur Dyes, of which the following is a specification.

Our invention relates to the manufacture and production of new yellowish-brown to orange sulfur dyestuffs which can be obtained by heating with sulfur mixtures of meta diamins alkylated in the aromatic nucleus with nitroamins or derivatives thereof and transforming the sulfid colors into soluble compounds by heating them with alkaline sulfids.

The new dyestuffs are after being dried and pulverized dark powders practically insoluble in pure water, but soluble in water in the presence of sodium sulfid with a brown color, hardly soluble in dilute caustic soda lye and in concentrated sulfuric acid with a brown color.

In order to illustrate the new process more fully the following example is given, the parts being by weight: 108 parts of meta-toluylenediamin, together with 60 parts of meta-nitranilin and 600 parts of sulfur, are heated to 240–250° C. for 12 hours. When cold the melt is pulverized and is heated to from 80–100° C. with 450 parts of a 100 per cent. solution of sodium sulfid and 2000 parts of water until a clear solution results. The mixture is then diluted with water and the dyestuff is precipitated with dilute acids. It is filtered off, dried and ground.

Our new dyestuff is after being dried and pulverized a dark brown powder which is practically insoluble in pure water, but soluble in water in the presence of sodium sulfid with a brown color, it is hardly soluble in dilute caustic soda lye with a brown color and in concentrated sulfuric acid (66° Baumé) with a yellowish-brown color. It dyes unmordanted cotton in a bath of sodium sulfid reddish yellow-brown shades.

The process is carried out in an analogous manner on using other of the above mentioned mixtures.

The same dyestuffs can be obtained by replacing the nitroamino-compounds by the corresponding dinitro compounds or by heating with sulfur mixtures of meta-diamins or triamins (derived from meta-diamins) or their derivatives with nitroamins alkylated in the aromatic nucleus or with the respective polynitro compounds and transforming the sulfid colors thus produced into soluble compounds by heating them with alkaline sulfids.

In the following table the shades of some of the new dyestuffs are given:

| Dyestuff obtained from: | Dyes cotton: |
| --- | --- |
| (1) Meta-toluylenediamin + meta-nitranilin | Reddish yellow-brown. |
| (2) Meta-toluylenediamin + para-nitranilin | Reddish yellow-brown. |
| (3) Meta-toluylenediamin + 4-nitro-2-toluidin | Reddish yellow-brown. |
| (4) Meta-toluylenediamin + dinitrodiacetbenzidin | Orange. |
| (5) Meta-toluylenediamin + dinitrodibenzoylbenzidin | Orange. |
| (6) Meta-toluylenediamin + formyl-meta-nitranilin | Yellow-brown. |
| (7) Meta-toluylenediamin + 4-nitro-2-formyl-toluidin | Reddish yellow-brown. |
| (8) Thio-urea of meta-toluylenediamin + para-nitranilin | Yellow-brown. |
| (9) Meta-toluylenediamin + 2.4-dinitrotoluene | Reddish yellow-brown. |
| (10) Meta-toluylenediamin + meta-dinitrobenzene | Reddish yellow-brown. |
| (11) Meta-toluylenediamin + 1.8-dinitronaphthalene | Yellowish-brown. |
| (12) Thio-urea of meta-toluylenediamin + meta-dinitrobenzene | Yellow-brown. |
| (13) Meta-phenylenediamin + 4-nitro-2-toluidin | Yellow-brown. |
| (14) Thio-urea of meta-phenylenediamin + 4-nitro-2-toluidin | Brownish-yellow. |
| (15) 2.4-diaminoacetanilid + 4-nitro-2-toluidin | Orange-yellow. |
| (16) 2.4-diaminoacetanilid + 2.4-dinitrotoluene | Yellow-brown. |

Having thus described our invention and in what manner the same is performed, what we claim as new, and desire to secure by Letters Patent, is:—

1. The herein-described new sulfur dyestuffs resulting from the reaction of sulfur on a mixture of aromatic meta-diamins and nitro-amins the one of which components must be alkylated in the aromatic nucleus, which are after being dried and pulverized dark powders practically insoluble in pure water but soluble in water in the presence of sodium sulfid with a brown color, hardly soluble in dilute caustic soda lye and in concentrated sulfuric acid with a brown color; and which dye unmordanted cotton in a bath containing sodium sulfid from yellowish-brown to orange shades, substantially as hereinbefore described.

2. The herein-described new sulfur dyestuff resulting from the reaction of sulfur on a mixture of meta-toluylenediamin with meta-nitranilin, which is after being dried and pulverized a dark brown powder, insoluble in pure water but soluble in water in the presence of sodium sulfid with a brown color, hardly soluble in dilute caustic soda lye with a brown color and soluble in concentrated sulfuric acid with a yellowish-brown color, and which dyes unmordanted cotton in a bath containing sodium sulfid reddish yellow-brown shades, substantially as hereinbefore described.

In testimony whereof we have hereunto set our hands in the presence of two subscribing witnesses.

ALFRED HERRE. [L. S.]
BERNHARD JAECKEL. [L. S.]

Witnesses:
OTTO KÖNIG,
WM. WASHINGTON BRUNSWICK.